3,261,064
AUTOMATICALLY ADJUSTING CONNECTING PIN
Charles William Turbyfill, Box 490, Marshall, Tex.
Filed May 13, 1964, Ser. No. 367,076
1 Claim. (Cl. 24—26)

My invention consists of an automatically adjusting connecting piece having two legs and being used in conjunction with two matching parts having compatible elongated openings to receive said connecting piece for the purpose of accomplishing an extendable and retractable connection.

An object of my invention is to provide the means of holding a cylindrical collar into frictional contact with a pipe around which it had been fitted.

Another object of my invention is to provide an automatic adjustment in the overall length of two parts which have been connected by my pin.

Another object of my invention is to provide a connection for two ends of a part or parts that must be held in tension for any reason.

Other and further objects will become more clearly apparent from the description which follows.

Referring to the drawings.

In describing my invention I would like to discuss first the common hinge.

There are many variations in detail of a common hinge, but the basic design and principle are present in most all of them. This device is so common that most everyone fully understands it. Briefly, the common hinge consists of three parts, a pin—cylindrically shaped—and two plates having along one edge of each matching, cylindrically shaped loops. The ferrules or loops, such as 1a, FIG. 2, on one-half of the hinge are alternately spaced in such a way as to permit the loops 1b of the other part to mesh compatibly and in such a manner that the cylindrical pin may be inserted and at once pass through the ferrules or loops 1a and 1b of both parts, thus joining them in limited rotatable fashion.

Figure 1:
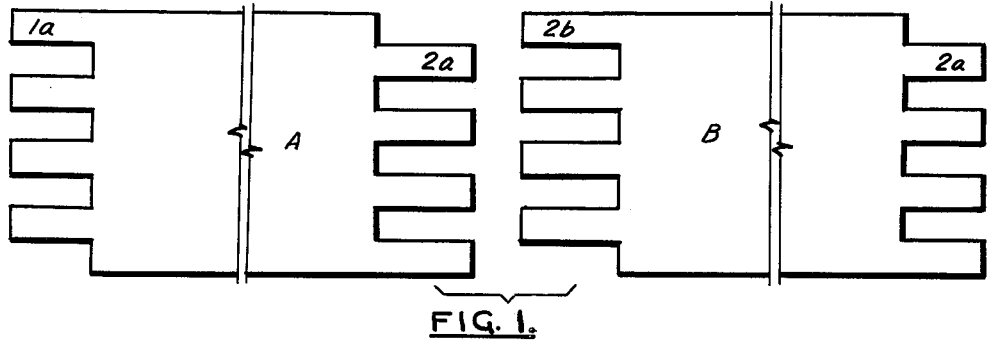
FIGURE 1 is an elevation of two plates A and B, each of which will comprise a formed half collar in this series of drawings, with the extremities of each notched as shown.

I have discussed here the common hinge because of a similarity between the common hinge plates and the plates A and B required in the use of my invention. The similarity is in the manner in which the plates A and B, FIG. 1, must be notched so as to form the openings and the manner in which the two parts mesh together. The difference is instead of cylindrically shaped loops or openings as 1a and 1b, FIG. 2, the openings must be elongated as shown by the loops 2a and 2b, FIG. 2. The openings 2a and 2b have been elongated circumferentially according to dimension X—X, and the dimension X—X is greater than the radial dimension Z—Z, FIG. 2.

Figures 3, 4:
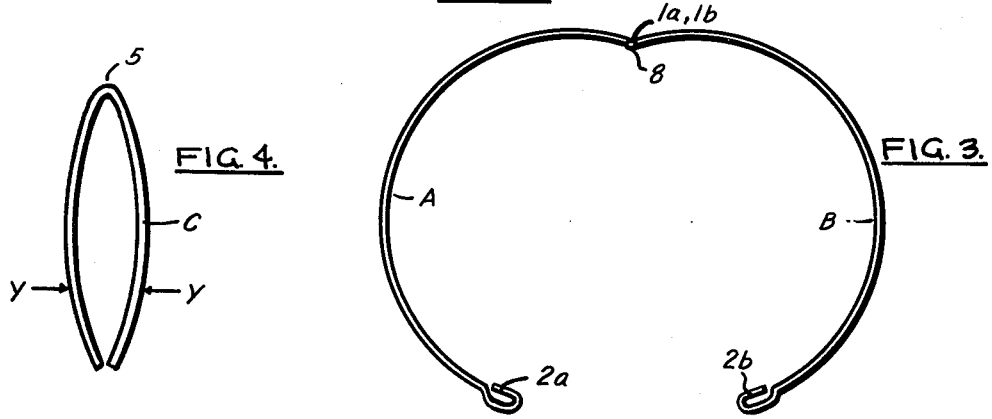
FIGURE 3 is the top view of plates A and B after each had been formed into a semi-circular shape and connected together at point 8, thus joining the half collars in limited rotatable fashion.
FIGURE 4 shows the shape and design of my automatically adjusting connecting pin.
Figure 5:
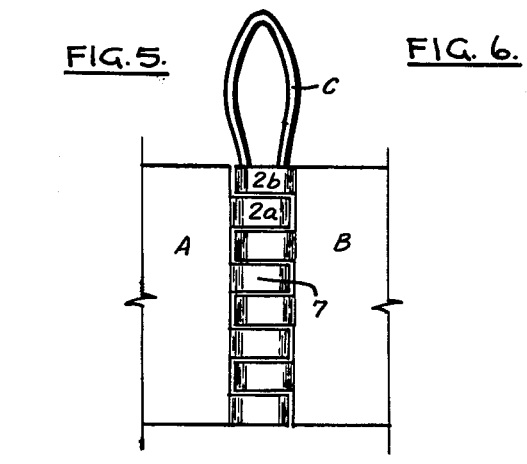
FIGURE 5 is an elevation of plates A and B with the notched and formed portions being meshed together and thus being connected with the pin shown in FIGURE 4.
Figure 6:
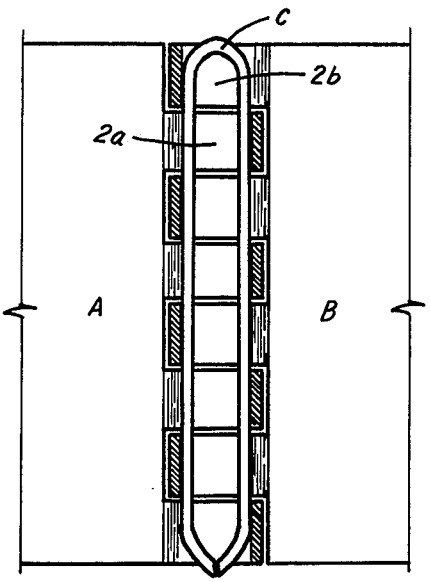
FIGURE 6 is a cross section of the plates A and B in FIGURE 5 showing the connecting pin fully inserted through the meshed loops.

It is apparent that this rectangular formation of the openings in the loops 2a and 2b could receive a pin or fastening piece that was rectangular in cross section. This, however, would cause the joint or connection of the matching parts A and B to be fixed or rigid, rather than slidable and retractable. Even though my invention, FIG. 4, has two legs I will henceforth refer to it as a pin C. My pin C as I am now making it consists of a piece of spring wire which has been doubled back at a point 5 on or near the center to form two legs that arch outwardly, remaining all in the same plane, and return to meet at the ends. This spring wire must retain its spring qualities or be reheat treated to restore them before the pin C is used for an adjustable connection. It is apparent that the two special loop formations 2a and 2b can be matched together and that the pin C can be forced into the openings, thus connecting the two parts, as shown in FIG. 6. The pin C must be forced into the loops 2a and 2b as the dimension across the legs of the pin, dimension Y—Y, is as great as, or greater than, the dimension X—X of the openings 2a and 2b and the pin C must be collapsed so as to enter the openings of the matched parts, as seen in FIG. 5. It is also apparent that the pin C when installed within the matched loops 2a and 2b is under compression and will cause the parts A and B to be fully meshed together, see FIG. 6. It can be seen in FIG. 6 that the dimension X—X of the loops 2a and 2b is such that there will be a space between the legs of the pin C when installed within said loops. It is further apparent that the two parts A and B could be pulled apart at the connection to the extent that the two legs of the pin C would be drawn together, but when released the spring pin C would pull the parts A and B back together again.

From this example it would be clear that the two half collars A and B, as an example of one use of my invention, having a conventional type hinge with cylindrical openings in the loops 1a and 1b and cylindrical pin for hinging purposes and special loop formations 2a and 2b for receiving pin C for locking purposes could be placed around a pipe having a diameter corresponding within practical bounds to the inner diameter of the assembled half collars A and B, and would therefore because of the action of the pin C be held closely against said pipe. Pin C would also adjust the half collars A and B to slight variations in the diameter of said pipe, at the same time maintaining a close frictional fit against said pipe. The degree of frictional hold of the half collars A and B against said pipe can be controlled by the diameter of the wire from which the pin C is made, as the strength of the pin C is thus controlled.

I have thus far dealt with my invention as a means of accomplishing a slidable, or extendable, and retactable connection. A further part of my invention deals with pin C as a locking device for maintaining an exact and fixed hold of half collars A and B to the pipe and increasing the strength of the frictional hold to a degree many times greater than the strength of the pin C itself could generate. It is to be understood that when two half collars A and B are joined on one side by an ordinary hinge 1a and 1b and are to be connected on the opposite side by the special loop formation 2a and 2b that the elongated loops 2a and 2b do not fully mesh when the collar is closed tightly against the pipe. The material from which the half collars A and B are formed are cut to various lengths to suit pipe of various diameters and to preserve this condition in all cases. The elongated loops 2a and 2b will never fully mesh when the collars are installed around pipe of maximum allowable undersize. On the other hand dimension X—X is such that the legs of the pin C will never be drawn together when the collars are installed on a pipe of maximum allowable oversize. The two legs of the pin C will always be separated.

The remaining part of this description relates to the use of my pin C as a means of exerting a greatly increased frictional hold of the half collars A and B to the pipe. It will be noted in FIGURE 6 that the flat surface of the openings of the loops 2a and 2b bridge across the two legs of the pin C. To accomplish the increased frictional hold of the collars A and B to the pipe, the outer surface 7 of the elongated loops 2a and 2b, by use of suitable tools, is depressed between the legs of pin C. When this is done with a blunt edged instrument and a hammer, the legs of the pin C will be forced apart to the extreme limit. For this purpose the pin C does not necessarily need to be of spring material.

Figure 2:
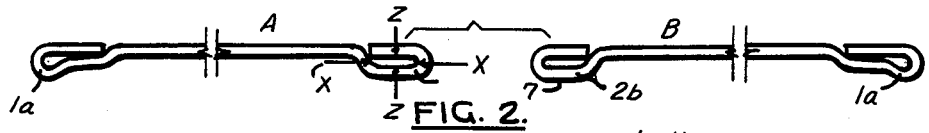
FIGURE 2 is the top view of plates A and B with the extremities of each formed into loops as described hereinafter.

My invention consists of a connecting piece C having two legs and being used in conjunction with matching parts A and B having elongated openings 2a and 2b as in FIG. 2, and all parts being of compatible size and shape so as to permit full use of my device as I have described previously. In making my claim to this invention, the length of the pin C will refer to the greatest dimension of the pin, the width of the pin C will be the second greatest dimension and the thickness of the pin will refer to the smallest dimension of the pin C. The length of the openings in the special loop formations 2a and 2b will refer to dimension X—X and the width of the openings will refer to dimension Z—Z.

It is to be understood that because I refer in this application to use of my pin C for connecting half collars, I do not limit myself to this usage, but instead I claim its use in any case where a slidable, or extendable, and retractable connection is required, or where automatic adjustment in the connection is required.

Having thus completely and thoroughly described my invention and having shown that all objects set forth are both worthwhile and necessary, I hereby make the following claims pertaining to this invention.

I claim:

The combination of an adjustable collar maintained in frictional contact with a tubular section and a pin for holding the collar in frictional contact therewith comprising:

(a) a collar for surrounding pipe including two plates joined at one end thereof and having elongated rectangular spaced apart resilient ferrules transverse to the longitudinal length of said plates at each of the other ends thereof, each of said ferrules positioned whereby said plates may be matched and joined together to surround the pipe and said ferrules are thereby positioned in a meshed relationship, (b) an outwardly arcuately curved loop pin including two similarly curved arcuate legs facing each other whereby the legs are farthest apart at their centers, (c) said legs joined at one end thereof to thereby form said loop pin whereby said loop pin is forcibly inserted in said meshed ferrules and said legs of said pin exert a force against said ferrules to hold said collar together and in frictional contact with the tubular section, and (d) said resilient ferrules are thereafter pinched to prevent said legs of said loop pin from being meshed together whereby said collar is locked on the tubular section.

References Cited by the Examiner
UNITED STATES PATENTS

| | | | |
|---|---|---|---|
| 1,308,018 | 6/1919 | Wilson | 85—8.3 |
| 1,433,379 | 10/1922 | Kiesel | 16—168 |
| 1,573,579 | 2/1926 | Ross | 16—168 |
| 2,077,891 | 4/1937 | Milnes | 24—33 |
| 2,181,831 | 11/1939 | McLaughlin | 189—34 |
| 2,666,241 | 1/1954 | Hall | 24—31 |

WILLIAM FELDMAN, *Primary Examiner.*

DONLEY J. STOCKING, *Examiner.*

D. L. BURGESS, *Assistant Examiner.*